United States Patent
Chavet

(12) 
(10) Patent No.: US 6,270,678 B1
(45) Date of Patent: Aug. 7, 2001

(54) METHOD FOR TREATING ALKALINE WASTE WATER

(76) Inventor: Bernard Chavet, Le Hennetot, 27210 Beuzeville (FR)

( * ) Notice: Subject to any disclaimer, the term of this patent is extended or adjusted under 35 U.S.C. 154(b) by 0 days.

(21) Appl. No.: 09/463,232

(22) PCT Filed: Jul. 22, 1998

(86) PCT No.: PCT/FR98/01614

§ 371 Date: Mar. 21, 2000

§ 102(e) Date: Mar. 21, 2000

(87) PCT Pub. No.: WO99/05067

PCT Pub. Date: Feb. 4, 1999

(30) Foreign Application Priority Data

Jul. 22, 1997 (FR) .................................................. 97 09290

(51) Int. Cl.⁷ ...................................................... C02F 1/66
(52) U.S. Cl. ........................ 210/708; 208/179; 208/181; 208/183; 210/721; 210/724; 210/726; 210/737; 210/756; 210/759; 210/763; 210/772; 210/909
(58) Field of Search .................................... 208/179, 181, 208/183; 210/708, 712, 721, 724, 725, 726, 727, 737, 756, 758, 759, 763, 772, 909

(56) References Cited

U.S. PATENT DOCUMENTS

| | | | | |
|---|---|---|---|---|
| 2,952,624 | * | 9/1960 | Lister et al. ........................ | 208/181 |
| 3,707,464 | * | 12/1972 | Burns et al. ........................ | 210/708 |
| 4,256,578 | * | 3/1981 | Kozar et al. ........................ | 210/766 |
| 4,293,424 | * | 10/1981 | Baur et al. ........................ | 210/737 |
| 4,357,243 | * | 11/1982 | Dobrez et al. ...................... | 210/752 |
| 5,501,741 | * | 3/1996 | McMahon ............................ | 134/13 |
| 5,716,528 | * | 2/1998 | Jasim et al. ........................ | 210/668 |
| 6,072,065 | * | 6/2000 | Chavet ................................ | 554/195 |

FOREIGN PATENT DOCUMENTS

| | | |
|---|---|---|
| 2843950 | 4/1980 | (DE) . |
| 534364 | 3/1993 | (EP) . |
| 2365525 | 4/1978 | (FR) . |
| 2367821 | 5/1978 | (FR) . |
| 2384721 | 10/1978 | (FR) . |
| 1032725 | 6/1966 | (GB) . |

* cited by examiner

Primary Examiner—Peter A. Hruskoci
(74) Attorney, Agent, or Firm—Nixon & Vanderhye P.C.

(57) ABSTRACT

The present invention relates to a method of treating alkaline waste water originating from washing spent oil which has undergone an alkaline treatment with water and which contains organic material. This method can produce water which can be discharged into conventional industrial water treatment facilities or which can be used directly as a base for preparing fertilizers or for preparing an agent for preventing ice formation on road surfaces.

16 Claims, No Drawings

METHOD FOR TREATING ALKALINE WASTE WATER

The present invention relates to a method of treating alkaline waste water originating from washing spent oil which has undergone an alkaline treatment with water and which contains organic material. This method can produce water which can be discharged into conventional industrial water treatment facilities or which can be used directly as a base for preparing fertilizers or for preparing and agent for preventing ice formation on road surfaces.

Within the context of the present invention, the expression "washing spent oil which has undergone an alkaline treatment with water and which contains organic material" means the water washing step carried out in the refining method of used oils as claimed in International patent application WO-97/00928 published on Jan. $9^{th}$, 1997. That method, which can produce reusable refined oils, comprises specific successive steps consisting in distilling a spent oil, carrying out an alkaline treatment on the resulting distillate, washing the reaction medium formed with water, and distilling the oily phase recovered after settling out at the end of the water washing step.

When refining spent oils, the water washing step thus produces an aqueous phase, hereinafter termed "alkaline waste water", in the form of an excessively colored and odoriferous solution (ASTM color not measurable; appearance of black coffee and phenolic type odor) which cannot be discharged into conventional industrial water treatment facilities and which cannot be recycled in any form.

Alkaline waste water generally has the following principal characteristics:

TABLE 1

| Characteristics | |
| --- | --- |
| pH | Over 13 |
| Color | ASTM not measurable (appearance of black coffee) |
| Specific gravity | 1 to 1.250 |
| Alkaline agent (sodium or potassium hydroxide; % by weight) | 1–20 |
| Salts of organic acids (% by weight) | 5–50 |
| Various mineral salts of alkaline agent (% by weight) | 0.1–4.5 |
| Phenolic compounds (mg/l) | 0–8000 |
| Water (% by weight) | 30–90 |

The alkaline agent is sodium or potassium hydroxide, which alkaline agents are in normal use in alkaline waste water treatments, and in particular in the alkaline treatment step of the method described in International application WO-97/00928, the conditions of which are such that there always subsists a proportion of the alkaline agent which has not reacted and which is thus present in the alkaline waste water to be treated. The organic acid salts have a variety of origins but they originate mainly from the organic acids initially present in the spent oil and which are transformed into the corresponding salts during treatment with the alkaline agent. They can also originate from esters conventionally present in commercial lubricating oils, which esters are decomposed during the high temperature alkaline treatment to form acids and alcohols which are themselves transformed into acids given the oxidizing nature and the temperature of the reaction medium; those acids form the corresponding salts with the alkaline agent.

The various mineral salts of the alkaline agent present in the alkaline waste water were formed during the alkaline treatment by the action of the alkaline agent on the various contaminants present in the treated spent oil, such as chlorine, phosphorous and silicon compounds, the corresponding anions of which are, for example, $Cl^-$, $PO_4^{3-}$ and $SiO_3^{2-}$.

Finally, the phenolic compounds are those which are normally present in spent oils such as those treated in the method of WO-97/00928. In particular, those phenolic compounds include phenol, o-, m- and p-cresols and di- and tri-methylpehnols (including, of course, all isomers thereof). They are present in small quantities which are, however, sufficient to produce a color and an odor which must be eliminated. They are measured using the method described in French standard NF XPt 90109 from AFNOR [French Standards Committee].

It should be understood, however, that such alkaline waste water is a complex solution which is difficult to define, in particular the exact nature of the organic esters and acids present, because of confidential nature about the compositions of the spent lubricating oils from which they originate.

A first solution for treating such alkaline waste water consisted of incinerating it, but clearly the heat balance for such a method is not economically viable. Evaporation prior to incineration has also been attempted but there again such a method is not economically viable. Attempts have also been made to separate the organic compounds from the alkaline waste water, firstly using physical separation methods such as filtration, tangential filtration, ultrafiltration, or centrifuging, but without producing any satisfactory results when the alkaline waste water to be treated is in the form of a single liquid phase.

In addition to such unsuccessful physical methods, neutralization of the alkaline waste water has been attempted, but it has proved impossible to obtain any separation of the organic compounds under such conditions. Attempts have been made to encourage separation by increasing temperature during neutralization, which has again proved completely unsuccessful even when the alkaline waste water is left in contact with the neutralization agent for a longer period.

Surprisingly and unexpectedly, it has now been discovered that it is possible to obtain clear decolorized water which is free of organic compounds from alkaline waste water using a method comprising a specific succession of steps, the order of which is essential in order to produce such a result.

Thus the present invention provides a method of treating alkaline waste water originating from a step of washing spent oil which has undergone alkaline treatment with water, said alkaline waste water also containing organic material, the method being characterized in that it comprises a set sequence of steps comprising:

a) bringing the alkaline waste water into contact, at a temperature in the range about 60° C. to 105° C. and for a period in the range about 5 to 60 minutes, with a mineral acid in a quantity 1% to 20% higher than that corresponding to the stoichiometry of the reaction, thus transforming all of the alkali atoms present in the alkaline waste water to be treated into a mineral salt;

b) allowing the organic and aqueous phases obtained to settle at a temperature in the range about 60° C. to 105° C., to recover the acidic aqueous phase;

c) bringing the acidic aqueous phase into contact, at a temperature in the range about 65° C. to 95° C., with an alkaline solution in a quantity sufficient to obtain a pH in the range 7.5 to 9 in the reaction medium, then allowing the reaction medium to stand at a temperature in the range about 40° C. to 95° C. to allow a flocculate to form and then settle out, and filtering to recover and aqueous phase.

In particular, the mineral acid used in step a) is selected from the group formed by hydrochloric acid, nitric acid, sulfuric acid, phosphoric acid, and mixture thereof.

The quantity of mineral acid used in step a) is thus calculated from that corresponding to the stoichiometry of the reaction transforming all o the alkali atoms present in the alkaline waste water to be treated into a mineral salt. To this end, the total number of alkali atoms is determined, usually by measuring the proportion by weight of sodium and/or potassium atoms present in various forms in the alkaline waste water to be treated, for example by plasma analysis in accordance with ASTM D5185 [American standard]. Depending on the mineral acid used, the stoichiometry of the reaction transforming an alkali atom (sodium or potassium) into a mineral salt is reduced and thus the quantity of mineral acid necessary to react with all of the alkali atoms, measured as indicated above, is determined so as to deduce the value which is higher than that quantity by 1% to 20%, that value corresponding to the quantity of mineral acid which must be used in step a). Surprisingly and unexpectedly, it has been shown that only this 1% to 20% higher quantity combined with the temperature employed enable an aqueous phase and an organic phase to be formed from the alkaline waste water to be treated, the organic phase in particular containing the organic acids mentioned above.

In a preferred implementation of the present invention, the quantity of mineral acid used in step a) is 8% to 12% higher than that corresponding to said stoichiometry.

The mineral acid is brought into contact with the alkaline waste water in known manner, in particular by stirring using a stirring means such as a turbine or a static mixer.

The alkaline waste water is preferably brought into contact with the mineral acid at a temperature in the range about 90° C. to 95° C., preferably for a period in the range about 20 to 40 minutes.

At the end of step a), an organic phase and an acidic aqueous phase are observed to form and are allowed to settle out from each other in step b) as described above. In particular, settling is by simple gravimetric settling. Preferably, settling is carried out keeping the temperature in the range about 90° C. to 95° C.

When settling is complete, filtering is carried out and the aqueous phase is recovered to bring it into contact with an alkaline solution in step c) of the present method.

In step c), the alkaline solution is preferably an aqueous solution based on an alkaline agent selected from sodium hydroxide, potassium hydroxide and a mixture thereof, the concentration of said alkaline agent, being in the range about 5% to 50% by weight relative to the total weight of said alkaline solution.

In particular, the concentration of alkaline agent is in the range about 10% to 30% by weight relative to the total weight of the alkaline solution. The quantity of this alkaline solution to be used can be determined by the skilled person using his general knowledge to obtain a pH of the reaction medium in the range about 7.5 to 9.

Preferably, a quantity of alkaline solution is used such that the pH of the reaction medium is in the range about 8 to 8.5.

The temperature sued to bring the aqueous phase into contact with the alkaline solution is preferably in the range about 65° C. to 90° C. The aqueous phase and the alkaline solution are brought into contact with stirring in the manner described for step a).

Once the desired pH has been reached, stirring is stopped and the reaction medium is allowed to stand, preferably at a temperature in the range about 65° C. to 95° C. Once stirring has been stopped, cloudiness is observed to form in the reaction medium which results in the formation of a flocculate, formation being complete in less than one hour. Since the reaction medium has been left to stand, the flocculate which is formed settle out over a few hours by sedimentation, it is filtered using know means, and the flocculate-free aqueous phase is then recovered.

The aqueous phase which is recovered is clear and includes insignificant quantities of hydrocarbons (less than 10 mg/kg). However, this aqueous phase is not completely colorless and can in some cases have a slight odor due to the presence of phenolic compounds.

Thus in a particular implementation, the present method further comprises a step consisting in bringing this aqueous phase recovered from the end of step c) into contact, at a temperature in the range about 65° C. to 95° C. and for a period in the range about 10 to 60 minutes, with at least one agent for eliminating phenolic compounds. This agent is preferably selected from the group formed by hydrogen peroxide which may optionally comprise a catalytic system based on ferrous ions, activated charcoal, sodium hypochlorite and a mixture thereof.

When the agent for eliminating phenolic compounds is hydrogen peroxide, it is preferably 110 volume hydrogen peroxide (about 33% by weight ) and about 0.5% to 30% by volume, preferably about 2% to 15% relative to the volume of the aqueous phase to be treated is preferably used.

This hydrogen peroxide can advantageously comprise a catalytic system based on ferrous ions, in particular an aqueous solution of ferrous sulfate (with formula $FeSO_4, 7H_2O$). In this case the catalytic system based on ferrous ions is preferably used in an amount of about 0.1% to 1.5% by weight, and more particularly in an amount of about 0.2% to 0.5% by weight of iron relative to the weight of aqueous phase to be treated.

When the agent for eliminating phenolic compounds is activated charcoal, it is used in a n amount of about 0.2% to 1% by weight, preferably in an amount of about 0.3% to 0.6% by weight, relative to the weight of the aqueous phase to be treated.

Finally, when the agent for eliminating phenolic compound is sodium hypochlorite, it is preferably sodium hypochlorite with a French chlorometric number of 55° (i.e., about 36% by weight). It is used in an amount of about 1% to 60% by volume, preferably in an amount of about 10% to 30% by volume relative to the volume of the aqueous phase to be treated.

Clearly, it is possible to use a plurality of these different agents for eliminating phenolic compounds either successively or as a mixture, depending on the aqueous phase to be treated. At the end of the present method, this supplemental step can produce a decolorized and deodorized aqueous phase comprising a very reduced phenolic compound content.

In a further particular implementation of the present invention, it is possible to carry out this supplemental step directly on the alkaline waste water to be treated, i.e., before step a), under the same conditions as those described above by assuming that the starting alkaline waste water represents the aqueous phase to be treated.

Finally, in a particularly preferred implementation, this supplemental step with the agent for eliminating phenolic compounds is carried out to treat the acidic aqueous phase recovered after step b) and before commencing step c). This implementation has quite surprisingly and unexpectedly prove to be especially effective in that almost all of the phenolic compounds are eliminated. The acidic aqueous phase which is thus free of phenolic compounds then undergoes step c) at the end of which a colorless and odorless aqueous phase is recovered. If this is not the case, this aqueous phase can be brought into contact with the agent for eliminating phenolic compounds once again, as described above.

Clearly, during the course of the method of the invention, this supplemental step of using an agent for eliminating phenolic compounds can be carried out a number of times following the different implementations described above.

In all cases, after bringing an aqueous phase into contact with the agent for eliminating phenolic compounds, the reaction medium is allowed to settle out and is then filtered using known means to recover the treated aqueous phase.

The present method can also produce an organic phase at the end of step b). In a preferred implementation of the present invention, this organic phase is washed with water at a temperature in the range about 70° C. to 100° C. with a water:organic phase volume ration in the range about 1:10 to 1:1, then allowed to settle to recover the treated organic phase. Preferably, this organic phase water washing step is carried out using a water:organinc phase volume ratio in the range 2:10 to 4:10, preferably at a temperature in the range about 90° C. to 95° C.

Thus the present method can produce an aqueous phase and an organic phase respectively from alkaline waste water. The aqueous phase can be discharged into conventional industrial water treatment facilities. Advantageously, this aqueous phase can be recycled since it is rich in mineral salts essentially resulting from the mineral acid introduced in step a) and the alkali atoms present in the starting alkaline waste water and those introduced via the alkaline solution of step c). Depending on the mineral acid used an the alkali atoms present (sodium and/or potassium), this aqueous phase comprises a large proportion of mineral salts such as KCl, NaCl, $KNO_3$, $NaNO_3$, $K_2SO_4$, $Na_2SO_4$, or $K_3PO_4$. The aqueous phase also contains various mineral salts of the alkaline agent present in the starting alkaline waste water as mentioned at the beginning of the present application. Advantageously, it is possible to use such an aqueous phase as a base for preparing fertilizer or as a base for preparing an agent for preventing ice formation on road surfaces.

Similarly, the organic phase obtained from the present method is rich in various organic acids, which depend on the starting alkaline waste water as explained at the beginning of the present application. Advantageously, this organic phase can be recycled by using it a substitute for organic acids, in particular as a substitute for naphthenic acids for bitumen acidification.

The following examples are intended to illustrate the present invention without in any way limiting its scope.

EXAMPLE 1

The alkaline treatment step of International application WO-97/00928 was carried out on a spent oil with 4% of a 50% by weight potassium hydroxide solution at 244° C. for 30 minutes. After cooling, the washing step was carried out using a volume of water equal to 10% of the volume to be washed. After settling, washing water with the following characteristics was recovered:

| Characteristics | |
|---|---|
| pH | Over 13 |
| Color | ASTM not measurable (appearance of black coffee) |
| Specific gravity | 1.1117 |
| Alkaline agent (sodium or potassium hydroxide; % by weight) | 7.65 |
| Salts of organic acids % by weight). | 14.20 |
| Various mineral salts of alkaline agent (% by weight) | 0.7 |
| Phenolic compounds (mg/l) | 820 |
| Water (% by weight) | 78.15 |

A total potassium proportion of 8.8% by weight relative to the total weight of the alkaline waste water to be treated was determined using plasma analysis, in accordance with ASTM D5185.

The alkaline waste water was treated as follows using the method of the invention.

The alkaline waste water was brought into contact with hydrochloric acid (35% by weight; specific gravity 1.17) in an industrial reactor, with stirring at 1500 revolution per minute (rpm), at a temperature of 92° C., in quantities of 24.6 volumes of acid per 100 volumes of alkaline waste water (thus comprising 0.25 moles of potassium in total) for a period of 25 minutes (thus using a quantity of hydrochloric acid which was 10.4% higher than that corresponding to the stoichiometry of the reaction transforming all of the potassium atoms present in the alkaline waste water to be treated into mineral salt).

After settling at the same temperature for three hours, a lower aqueous phase with a pH of 0.65 was recovered along with an upper oily phase representing 8.7% by weight of the total weight of the starting alkaline waste water.

Aqueous Phase Treatment

The recovered lower acidic aqueous phase was divided into two equal portions.

The first portion of the lower aqueous phase was brought into contact, with stirring, at a temperature of 88° C., with a 25% by weight aqueous potassium hydroxide solution to obtain a pH of 8.5 in the reaction medium. The reaction medium was allowed to stand at the same temperature for a period of 5 hours. During that period, a flocculate was observed to form the sediment of which, obtained by settling, represented 0.28% by weight relative to the total weight of the treated lower aqueous phase. After filtering using a slow filter (porosity 3 $\mu$m) as sold by DURIEUX, the resulting alkaline aqueous phase was clear but still slightly colored and distinguished by a very faint odor. It was established that it contained less that 10 mg/kg of various hydrocarbon compounds and that the phenolic compound content was about 324 mg/l.

In order to reduce the residual phenolic compound content, this resulting alkaline aqueous phase was brought into contact with 110 volume hydrogen peroxide at a temperature of about 92° C. for about 45 minutes, in an amount of 10 parts of hydrogen peroxide to 100 parts of the aqueous phase to be treated. After decanting and filtering using a slow filter (porosity 3 $\mu$m) as sold by DURIEUX, completely deodorized and decolorized water was recovered which had a phenolic compound content of about 92 mg/l.

The hydrogen peroxide treatment was also carried out under the same conditions but using the second portion of the recovered lower acidic aqueous phase as indicated above. The treated recovered aqueous phase then underwent step c) of the present method by being brought into contact with the 25% aqueous potassium hydroxide solution under the same conditions indicated above for the first portion of the lower acidic aqueous phase. After settling and sedimentation of the flocculate, a completely deodorized and decolorized aqueous phase with a phenolic compound content of 3 mg/l was filtered and recovered.

These two aqueous phases obtained using the method of the invention could be discharged into industrial water treatment facilities or, advantageously, could be recycled in the form of an aqueous base for preparing fertilizer or for preparing an agent for preventing ice from forming on road surfaces.

Treatment of Upper Organic Phase

The upper organic phase was washed with water at 90° C. using a volume of water representing 50% of the volume of the organic phase to be washed. After settling, an organic phase with the following characteristics was recovered:

| | |
|---|---|
| Density | 0.908 |
| Acid value | 164 mg KOH/g |
| Potassium | 6 mg/kg |
| Viscosity at 40° C. | 72 mm$^2$/s |
| Copper corrosion[1] | 1A |

[1]Measured by the method of AFNOR standard NF M 07015 (3 hours at 100° C.). In that method, the value "1A" corresponds to a complete absence of corrosive character.

The organic phase obtained using the present method can advantageously be used as a substitute for naphthenic acid for bitumen acidification.

Example 2

The operating described in Example 1 were repeated using the same alkaline waste water where the lower acidic aqueous phase obtained from step b) of the present method was brought into contact with hydrogen peroxide under the same conditions as for said second portion of the lower acidic aqueous phase of Example 1 with the exception that that the hydrogen peroxide also comprised a 30% by weight ferrous sulfate solution (FeSO$_4$, 7H$_2$O) in an amount of 0.25% by weight of iron relative to the weight of the lower acidic aqueous phase to be treated. After contact with the potassium hydroxide solution, settling and filtering, under the same conditions as those described for Example 1, a completely deodorized and decolorized aqueous phase with a phenolic compound content of 0.8 mg/l was recovered.

What is claimed is:

1. A method of treating alkaline waste water originating from washing spent oil with water, said alkaline waste water also containing organic material, the method comprising the following sequence of steps:

a) bringing the alkaline waste water into contact, at a temperature in the range about 60° C. to 105° C. and for a period in the range about 5 to 60 minutes, with a mineral acid in a reaction wherein said mineral acid is present in a quantity 1% to 20% greater than a stoichiometric amount, transforming any alkali atoms present in the alkaline waste water to be treated into a mineral salt;

b) allowing organic and aqueous phases obtained to settle at a temperature in the range about 60° C. to 105° C., to recover an acidic aqueous phase;

c) forming a reaction medium by bringing the acidic aqueous phase into contact, at a temperature in the range about 40° C. to 95° C., with an alkaline solution in a quantity sufficient to obtain a pH in the range 7.5 to 9 in the reaction medium, then allowing the reaction medium to stand at a temperature in the range about 40° C. to about 95° C. to allow a flocculate to form and then settle out, and filtering to recover an aqueous phase.

2. A method according to claim 1, wherein the mineral acid is selected from the group consisting of hydrochloric acid, nitric acid, sulfuric acid and phosphoric acid, and a mixture thereof.

3. A method according to claim 1, wherein the quantity of mineral acid employed is higher by 8% to 12% than that corresponding to said stoichiometric amount.

4. A method according to claim 1, wherein the alkaline waste water is brought into contact with said mineral acid at a temperature in the range about 90° C. to 95° C.

5. A method according to claim 1, wherein the alkaline waste water is brought into contact with said mineral acid for a period in the range about 20 to 40 minutes.

6. A method according to claim 1, wherein in step b), settling is carried out at a temperature in the range about 90° C. to 95° C.

7. A method according to claim 1, wherein said alkaline solution of step c) is an aqueous solution based on an alkaline agent selected from sodium hydroxide and potassium hydroxide and a mixture thereof, the concentration of said alkaline agent being in the range about 5% to 50% by weight relative to the total weight of said alkaline solution.

8. A method according to claim 7, wherein said concentration of said alkaline agent is in the range about 10% to 30% by weight relative to the total weight of said alkaline solution.

9. A method according to claim 1, wherein the pH of the reaction medium in step c) is in the range about 8 to 8.5.

10. A method according to claim 1, further comprising a step consisting in bringing said aqueous phase recovered from the end of step c) into contact, at a temperature in the range about 65° C. to 95° C. and for a period in the range about 10 to 60 minutes, with at least one agent for eliminating phenolic compounds selected from the group formed by hydrogen peroxide optionally comprising a catalytic system based on ferrous ions, activated charcoal and sodium hypochlorite, and a mixture thereof.

11. A method according to claim 10, wherein said catalytic system based on ferrous ions is an aqueous ferrous sulfate solution.

12. A method according to claim 1, further comprising, prior to step a), a step consisting in bringing said alkaline waste water into contact at a temperature in the range about 65° C. to 95° C. and for a period in the range about 10 to 60 minutes, with an agent for eliminating phenolic compounds selected from the group formed by hydrogen peroxide optionally comprising a catalytic system based on ferrous ions, activated charcoal and sodium hypochlorite, and a mixture thereof, then allowing settling and filtering to recovered the alkaline waste water to be treated in step a).

13. A method according to claim 1, further comprising bringing said aqueous phase recovered from step b) into contact, at a temperature in the range about 65° C. to 95° C. and for a period in the range about 10 to 60 minutes, with an agent for eliminating phenolic compounds selected from the group formed by hydrogen peroxide optionally comprising a catalytic system based on ferrous ions, activated charcoal, sodium hypochlorite and a mixture thereof, then allowing settling and filtering to recover the aqueous phase.

14. A method according to claim 1, further comprising a step consisting in washing the organic phase obtained at the end of step b) with water; at a temperature in the range about 70° C. to 100° C., in a water:organic phase volume ration in the range about 1:10 to 1:1 then allowing settling to recover the organic phase.

15. A method according to claim 14, wherein said water:organic phase volume ratio is in the range about 2:10 to 4:10.

16. A method according to claim 14, wherein said organic phase obtained at the end of step b) is washed with water at a temperature in the range about 90° C. to 95° C.

* * * * *